United States Patent
Humphreys

(10) Patent No.: US 8,607,779 B2
(45) Date of Patent: Dec. 17, 2013

(54) SOLAR DRAINBACK TANK

(75) Inventor: Michael Humphreys, Nanjing (CN)

(73) Assignee: Apricus Inc., Branford, CT (US)

( * ) Notice: Subject to any disclaimer, the term of this patent is extended or adjusted under 35 U.S.C. 154(b) by 207 days.

(21) Appl. No.: 13/102,764

(22) Filed: May 6, 2011

(65) Prior Publication Data

US 2012/0279491 A1 Nov. 8, 2012

(51) Int. Cl.
*F24J 2/04* (2006.01)

(52) U.S. Cl.
USPC ............ 126/640; 126/642; 126/643; 126/646

(58) Field of Classification Search
USPC ......... 126/640, 433, 434, 435, 436, 437, 438, 126/427, 428, 450, 417, 362, 422, 400, 610, 126/416, 448, 420, 642, 643, 646
See application file for complete search history.

(56) References Cited

U.S. PATENT DOCUMENTS

| | | | | |
|---|---|---|---|---|
| 4,269,167 A | * | 5/1981 | Embree | 126/572 |
| 4,285,334 A | * | 8/1981 | Collins | 126/590 |
| 4,324,228 A | | 4/1982 | Shippee | |
| 4,397,294 A | | 8/1983 | Mancebo | |
| 4,510,922 A | | 4/1985 | Roussos et al. | |
| 4,562,828 A | * | 1/1986 | Koskela | 126/640 |
| 4,574,779 A | | 3/1986 | Hayes | |
| 4,691,692 A | * | 9/1987 | Conner et al. | 126/584 |
| 4,727,856 A | * | 3/1988 | Morse | 126/642 |
| 4,930,492 A | | 6/1990 | Rich | |
| 5,159,918 A | | 11/1992 | Roehl | |
| 5,575,276 A | | 11/1996 | Fossum et al. | |
| 2007/0227529 A1 | * | 10/2007 | Rubio et al. | 126/614 |

* cited by examiner

*Primary Examiner* — Kenneth Rinehart
*Assistant Examiner* — Bao D Nguyen
(74) *Attorney, Agent, or Firm* — St. Ogne Steward Johnston & Reens LLC

(57) ABSTRACT

A drainback tank having a solar return pipe, at least a portion of the solar return pipe being located within the internal body of the tank, the solar return pipe having a hole that is in close proximity to the hole of an output pipe, such that the fluid in the solar return pipe flows into the output pipe and leaves the tank housing to be used to heat the fluid of a corresponding hot water tank via convection in a heat exchanger.

26 Claims, 3 Drawing Sheets

SOLAR DRAINBACK TANK

CROSS-REFERENCE TO RELATED APPLICATIONS

The present application is related to co-pending U.S. patent application Ser. No. 13/033,230, entitled Hotwater Tank, which was filed on Feb. 23, 2011. The contents of U.S. patent application Ser. No. 13/033,230 entitled Hotwater Tank, are hereby incorporated by reference.

FIELD OF THE INVENTION

The present invention is directed to an improved and efficient drainback tank for use with a system that stores and distributes hot water.

BACKGROUND OF THE INVENTION

There is a need in society to store and distribute hot water. Hot water storage tanks are used to store and distribute (circulate) hot water throughout a plumbing system. Existing hot water storage tanks normally comprise an insulated storage vessel and a heating source. There are many designs for tanks that heat up, store and then deliver hot water to a standard outlet, such as a faucet.

Drainback tanks are types of tanks that are incorporated into systems that employ traditional hot water storage tanks. While adding complexity to these systems, drainback tanks offer a clear advantage to existing systems, as drainback tanks help keep the temperature of the water in hot water storage tanks and systems above freezing, so as to prevent system failure of these hotwater storage tanks. Drainback tanks use convection (a type of heat transfer) to heat the water in a separate hot water storage tank as the water from the hotwater storage tank is passed through a heat exchanger, which receives hot water from the drainback tank. This allows water in storage tanks to be heated when the temperature of the water in the storage tanks decreases, so that the water in the storage tanks does not freeze. Various designs of drainback tanks interacting with hotwater storage tanks are known in the art.

In existing designs, drainback tanks are connected to solar heating loops to heat the water the drainback tanks. Solar heating has become an important technique, as using solar heating allows for a relatively inexpensive way to heat hot water in drainback tanks. Existing designs may use solar heating, however, none of the existing designs provide for an improved design that efficiently uses convection to heat the water in the hotwater storage tank by using a drainback tank, the drainback tank able to achieve increased efficiency of heat transfer between the fluid in the drainback tank and the fluid in the hot water storage tank Various systems exist that provide for teaching solar heating with drainback tanks. U.S. Pat. No. 5,575,276 (Fossum et al.) discloses a solar thermal water heating system having heat exchangers and a drain back solar water heating tank that is separate from a storage tank. U.S. Pat. No. 4,930,492 (Rich) discloses a solar water heating system and return manifold system employing a floating valve. U.S. Pat. No. 4,574,779 (Hayes) discloses a solar water heating system including a draindown tank located at an elevation lower than that of the heat exchanger.

U.S. Pat. No. 4,562,828 (Koskela) discloses a solar water heating system that includes automatic drainback during freezing conditions. U.S. Pat. No. 4,269,167 (Embree) discloses a closed pressurized solar heating system with automatic valve less solar collector drain-back. Embree discloses a sump tank with internal pipe having a bottom opening at a height well below the operating level of the heat transport fluid within sump tank and also vent hole provide above the initial fluid fill level and above the drained-down thermally expanded fluid level and above the operating fluid level.

However, none of the existing systems provide for a design that has increased efficiency of heat exchange between the fluid of the drainback tank and the fluid of the hot water storage tank. None of these systems provides for a design that allows the hottest water to be fed directly to the heat exchanger, so as to increase the efficiency of heat exchange between the fluid of the drainback tank and the fluid of the hot water storage tank.

It is desirable to provide a system, method and apparatus that achieve optimal or near optimal efficiency in heat transfer between the fluid of the drainback tank and the fluid of the hot water storage tank. It is further desirable to provide a system that quickly allows for heat to be transferred. It is further desirable for a system that transfers the hottest water from the solar heating circuit to the heat exchanger, such that efficient heat transfer occurs.

It is desirable to accomplish these objectives and to provide an improved system that is efficient and provides for efficient heat transfer. Using systems with inefficient heat transfer causes the overall system performance to suffer. Moreover, systems with inefficient heat transfer take longer for the water in the hot water storage to tank to increase in temperature, which is undesired.

SUMMARY OF THE INVENTION

Thus, it is an object of the present invention to provide a drainback system that exhibits improved efficiency of heat exchange between the fluid of a drainback tank and the fluid of a hot water storage tank.

It is another object of the invention to provide a system that quickly allows for heat to be transferred from the fluid of a drainback tank to the fluid of a hot water storage tank. It is another object of the invention to provide a system that transfers the hottest water from the solar heating circuit to a heat exchanger, so that optimal heat transfer may occur from the fluid of a drainback tank to the fluid of a hot water storage tank.

It is another object of the present invention to provide a system that achieves optimal or near optimal efficiency in heat transfer between the fluid of a drainback tank and the fluid of a hot water storage tank These objects of the invention are achieved by providing a drainback tank comprising: a housing, the housing having a base and at least one side wall, the at least one side wall and the base forming an internal body for storing a fluid; a solar return pipe, at least a portion of the solar return pipe being located within the internal body of the tank, the solar return pipe having a hole; and an output pipe, the output pipe being attached to and passing through the housing and into the internal body of the tank, the output pipe having a hole located within the internal body of the tank, the hole of the output pipe being in close proximity to the hole of the solar return pipe, such that the fluid in the solar return input pipe flows into the output pipe and leaves the tank housing.

The hole in the solar pipe may be aligned with the hole in the output pipe, so that the fluid in the solar return pipe flows into the output pipe.

The hole in the solar return pipe may be located less than five inches from the hole in the output pipe. The hole in the solar return pipe may be located less than one inch from the hole in the output pipe. The hole in the solar return pipe may be located below the fluid level in the tank and towards the bottom of the solar return pipe. The solar return pipe may be parallel to the longitudinal axis of the tank.

The drainback tank may further comprise a pump, the pump exerting pressure upon the fluid in the solar return pipe, allowing the fluid to pass from the solar return pipe and into the output pipe, so that the fluid exits the tank.

The fluid in the output pipe may be passed through a heat exchanger after leaving the tank. The fluid leaving the heat exchanger may return to a solar heating circuit after undergoing heat transfer. The fluid passed into the heat exchanger may be the hottest fluid in the tank. The fluid pass to the heat exchanger may be the hottest fluid in the solar return pipe.

The solar return pipe may be connected to a solar heating circuit, so that the fluid returns from the solar heating circuit and into the solar return pipe. The solar return pipe may enter the tank above the level of fluid located within the tank and the length of the solar return pipe may extend the full height of the tank. The solar return pipe may, alternatively, enter the tank below the level of fluid located within the tank and the length of the solar return pipe may extend the full height of the tank.

The drainback tank may have a shape selected from a group consisting of a cylinder, rectangular cube, polyhedron, hexahedron, cuboid, trapezoid, pentagon, or cone. The drainback tank may be insulated and may have poor heat transfer properties.

The solar return pipe may be insulated and may have poor heat transfer properties. The solar return pipe may comprise an internal return pipe, the internal pipe being internal to and parallel to the longitudinal axis of the tank; and an external return pipe, the external return pipe being connected to the solar heating circuit, the external return pipe being connected with the internal return pipe and allowing the fluid returning from the solar heating circuit to pass through the external return pipe into the internal return pipe.

The solar return pipe may be made from various pipes of different diameters. Alternatively, the solar return pipe may be made from a single pipe that has different sections fused together to form a single pipe.

Other objects of the invention are achieved by providing a drainback tank comprising: a housing, the housing having a base and at least one side wall, the at least one side wall and the base forming an internal body for storing a fluid; and a solar return pipe, at least a portion of the solar return pipe being located within the internal body of the tank, the solar return pipe having a hole; wherein the housing has a hole in the side of the housing that allows the fluid to exit the internal body of the tank, the hole of the housing being in close proximity to the hole of the solar return pipe, such that the fluid in the solar return input pipe flows into the output pipe and leaves the tank housing.

The drainback tank may further comprise an output pipe, the output pipe being attached to the hole in the side of the housing, such that the fluid in the tank exits the hole in the housing and enters the output pipe to leave the tank housing.

The drainback tank may further comprise a suction port, the suction port being connected to the hole in the housing and having an angled flange that fills the hole in the housing and interacts with the output pipe.

The drainback tank may have the hole in the solar return pipe be aligned with the hole in the housing of the tank, so that the fluid in the solar return pipe flows into the hole in the housing of the tank and into the output pipe. The hole in the solar return pipe may be located less than five inches from the hole in the housing. The hole in the solar return pipe may be located less than one inch from the hole in the housing.

The drainback tank may further comprise a pump, the pump exerting pressure upon the fluid in the solar return pipe, allowing the fluid to pass from the solar return pipe and into the output pipe, so that the fluid exits the tank.

The fluid in the output pipe of the drainback tank may be passed through a heat exchanger after leaving the tank. The fluid leaving the heat exchanger may return to a solar heating circuit after undergoing heat transfer.

The solar return pipe may be connected to a solar heating circuit, so that the fluid returns from the solar heating circuit and into the solar return pipe. The solar return pipe may comprise an internal return pipe, the internal pipe being internal to and parallel to the longitudinal axis of the tank; and an external return pipe, the external return pipe being connected to the solar heating circuit, the external return pipe being connected with the internal return pipe and allowing the fluid returning from the solar heating circuit to pass through the external return pipe into the internal return pipe.

Other objects of the invention are achieved by providing a solar heating system comprising: a heat exchanger; a hot water storage tank, the hot water storage tank comprising: a housing, the housing having a base and at least one side wall, the at least one side wall and the base forming an internal body for storing a fluid, and a pipe, the pipe passing the fluid from the housing to the heat exchanger; and a drainback tank, the drainback tank comprising: a housing, the housing having a base and at least one side wall, the at least one side wall and the base forming an internal body for storing a fluid; a solar return pipe, at least a portion of the solar return pipe being located within the internal body of the drainback tank, the solar return pipe having a hole; and an output pipe, the output pipe being attached to and passing through the housing and into the internal body of the drainback tank, the output pipe having a hole located within the internal body of the drainback tank, the hole of the output pipe being in close proximity to the hole of the solar return pipe, such that the fluid in the solar return input pipe flows into the output pipe and leaves the tank housing and flows into the heat exchanger.

The fluid of the drainback tank may enter the heat exchanger and transfer heat to the fluid from the hot water storage tank. The solar heating system may have the drainback tank of various embodiments of the invention.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
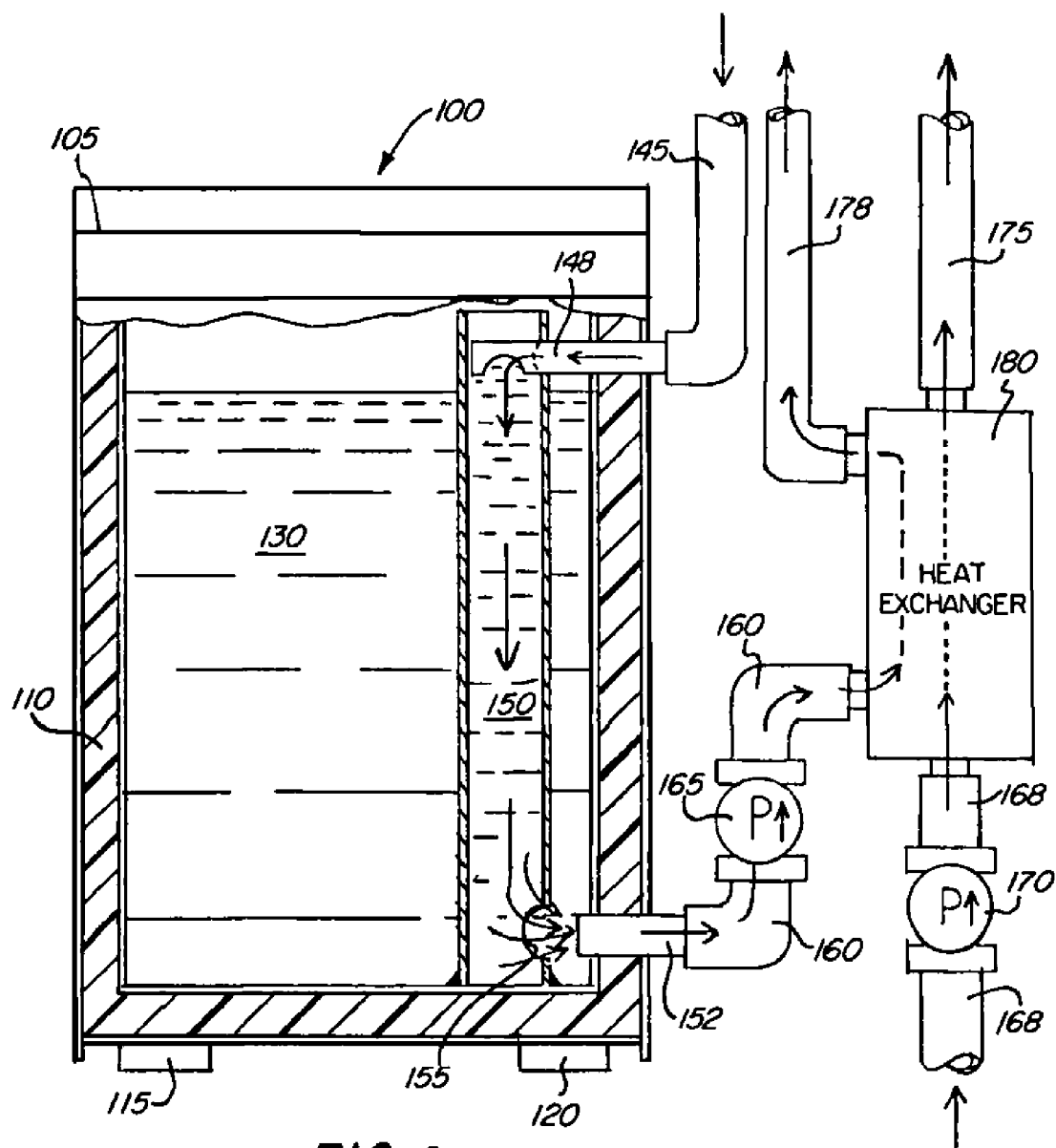
FIG. 1 is a side view of the drainback tank of one embodiment of the present invention showing the internal contents of the drainback tank.

Referring to FIG. 1, drainback tank 100 is provided. Drainback tank 100 has housing 110, housing 110 having a base and at least one sidewall. The base and the at least one sidewall are shown fused together to form housing 110. The housing may have insulation on its walls and on its base. Drainback tank 100 has lid 105 and is shown with legs 115 and 120. Drainback tank 100 has internal body 130 for storing a fluid.

Drainback tank 100 also is shown having internal return pipe 150. Internal return pipe 150 has external solar return pipe 145 connected to pipe 148, which is then connected to internal return pipe 150. There is a hole in pipe 148 that allows the fluid to pass from pipe 148 into solar return pipe 150.

The fluid from a solar heating circuit, which is hot, may pass into external solar return pipe 145 and into pipe 148. In certain embodiments, external return pipe 145 and pipe 148 are fused together as a single pipe. In certain embodiments, external return pipe 145, pipe 148 and internal return pipe 150 are fused together as a single pipe. External return pipe 145 is shown being external to tank 100 and internal return pipe 150 is shown internal to tank 100. Pipe 148 is shown passing through housing 110 and links external return pipe 145 with internal return pipe 150. Internal return 159, pipe 148, and external return pipe collectively form the solar return pipe 145/148/150.

Internal return pipe 150 has hole 155 located in the bottom portion of internal return pipe 150 or at the bottom of the solar return pipe 145/148/150. Hole 155 is located close to a hole in the distal end of output pipe 152, which is shown having its distal end located within internal body 130 of housing 110. This allows fluid from solar return pipe 150 to enter output pipe 152. The pressure to pull the fluid into output pipe 152 is created by pump 165. Other mechanisms to draw fluid may also be used other than pump 165 that are known in the art.

The diameter of hole 155 may range from less than a centimeter to a few inches. The hole in the distal end of output pipe 152 may also range from less than a centimeter to a few inches. Hole 155 and the hole in the distal end of output pipe 152 are shown being aligned with one another and are shown being a few centimeters from each other. This allows the fluid located in the internal return pipe 150 to be fed into output pipe 152.

Output pipe 152 is shown fused to pipe 160. Pipe 160 draws the fluid to heat exchanger 180. In certain embodiments, output pipe 152 and 160 may be fused together as single pipe. Output pipe 152/160 draws water out of internal body 130 of housing 110.

FIG. 1 also shows heat exchanger 180, heat exchanger 180 having fluid, such as water, drawn to it from another source, such as a hot water tank (not shown). Fluid from a hot water tank may pass through a pipe 168 to heat exchanger 180. This may be done via pump 170 or another such method used to draw fluid known in the art.

Thus, fluid from both drainback tank 100 and the hot water storage tank is drawn to heat exchanger 180. Here, the heat from the fluid of the drainback tank 100 is passed to the fluid of the hot water storage tank. This occurs via convection, a type of heat transfer, although other types of heat transfer may occur.

Having both the fluid from both drainback tank 100 and the hot water storage tank being drawn to heat exchanger 180 allows optimal heat transfer to occur. This is because the fluid of the drainback tank 100 is very hot and passes heat to the fluid of the hot water storage tank. In contrast, the fluid of the hot water storage tank is typically the coldest fluid from the hot water storage tank. Thus, heat transfer, will pass heat from hot to cold until equilibrium is reached. Thus, heat from the fluid from the drainback tank 100 will continuously pass to the fluid of the hot water storage tank that passes through the heat exchanger.

Once the water leaves the heat exchanger, the water from drainback tank 100 is passed to the solar heating circuit (not shown). Pipe 178 is shown leaving heat exchanger 180 and allows fluid to travel to the solar heating circuit.

Conversely, the hot water from the hot water storage tank is then passed back to the hot water storage tank. This is shown via pipe 175. The hot water is then able to pass into general circulation where it is accessible to users.

Figure 2:
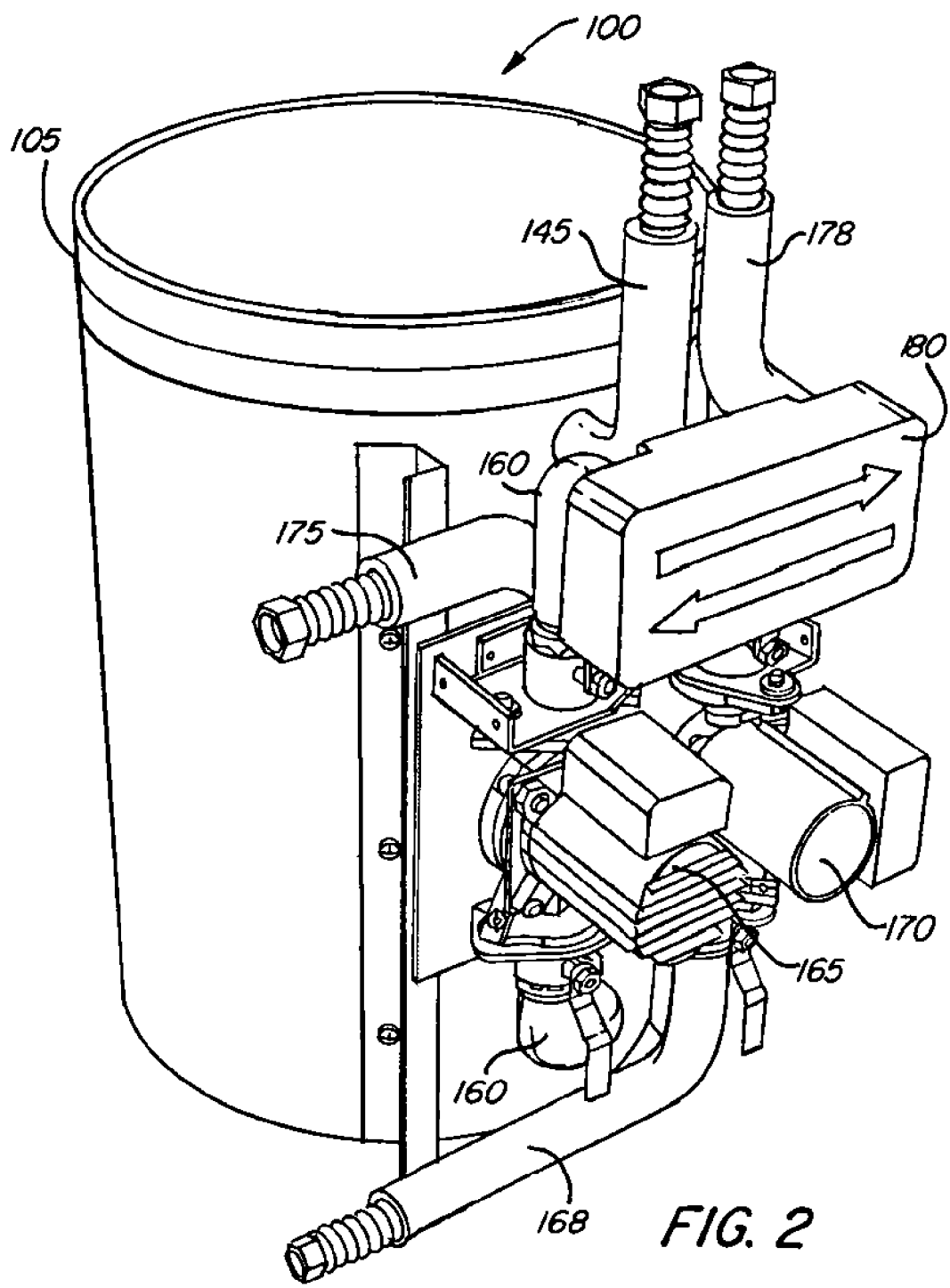
FIG. 2 is a perspective view of the drainback tank of FIG. 1.

FIG. 2 shows an external view of the drainback tank 100 of FIG. 1. Here, lid 105 of drainback tank is shown as well as pipes 145, 160, 168, 175 and 178. Also shown are pump 165 and pump 170 as well as heat exchanger 180, which are external to tank 100.

Figure 3:
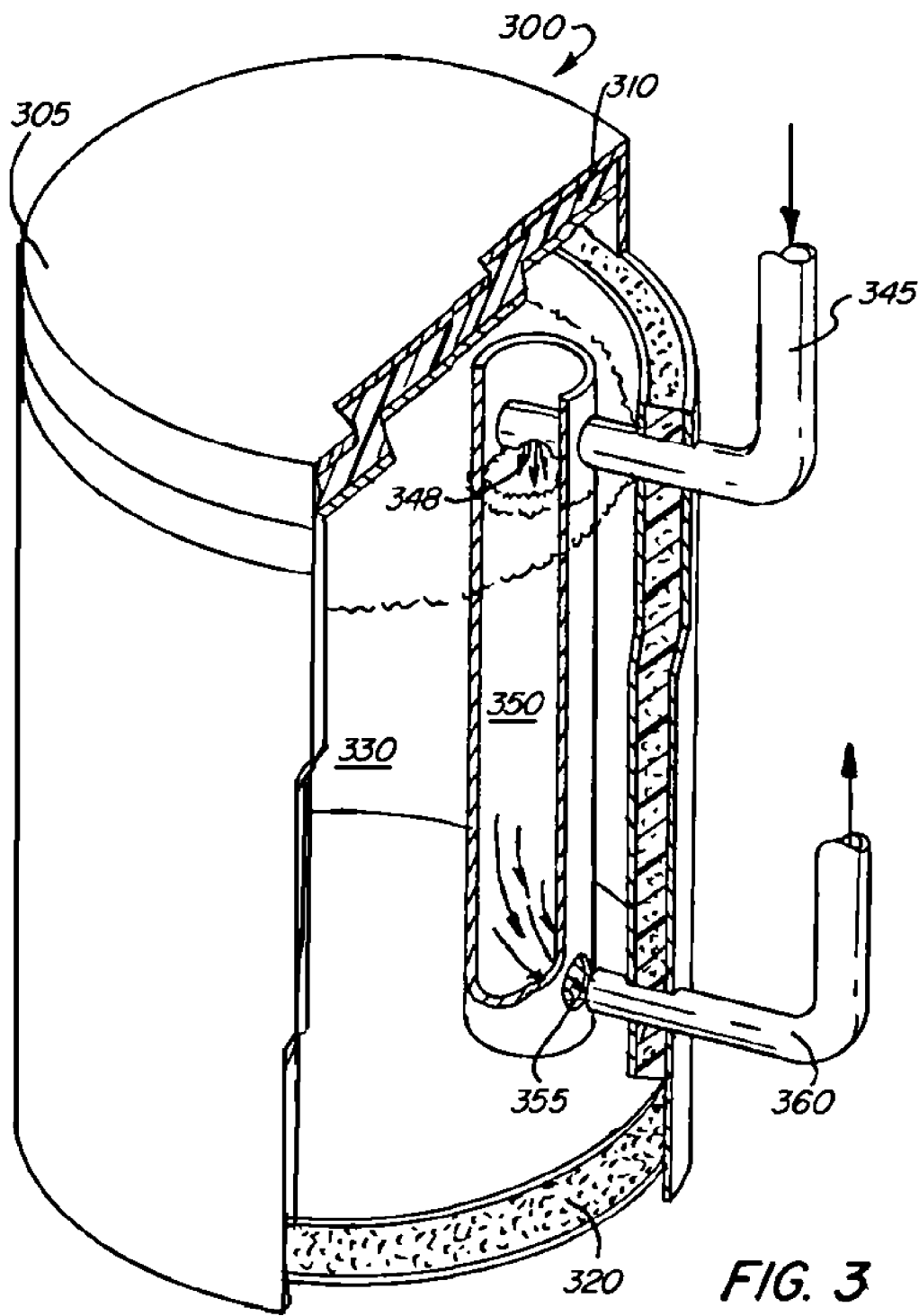
FIG. 3 is a perspective view of the drainback tank of FIG. 1 with insulation.

FIG. 3 is a view of tank 300, which is similar to tank 100, has its internal return pipe and external return pipe being shown fused together as one pipe. Here, external return pipe 345 is shown connected to internal return pipe 350. Internal return pipe 350 has hole 355 shown aligned with the distal end of output pipe 360. Hole 355 may be of various shapes and diameters.

The tank 300 is shown having lid 305 with insulation 310. The tank of the invention may or may not have insulation. Tank 300 also is shown having a base 320 that has insulation, although insulation is not required in all embodiments of the invention.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A drainback tank comprising:
   a housing, the housing having a base and at least one side wall, the at least one side wall and the base forming an internal body for storing a fluid;
   a solar return pipe, at least a portion of the solar return pipe being located within the internal body of the tank, the solar return pipe having a hole; and
   an output pipe, the output pipe being attached to and passing through the housing and into the internal body of the tank, the output pipe having a hole located within the internal body of the tank, the hole of the output pipe being aligned with and within a few inches of the hole of the solar return pipe,
   wherein a center axis of the hole of the solar return pipe is aligned with a center axis of the hole of the output pipe along a plane,
   wherein the fluid in the solar return pipe flows into the output pipe and leaves the tank housing, and
   wherein the hole in the solar return pipe is located below the fluid level in the tank and towards the bottom of the solar return pipe.

2. The tank of claim 1, wherein the hole in the solar return pipe is located less than five inches from the hole in the output pipe.

3. The tank of claim 1, wherein the hole in the solar return pipe is located less than one inch from the hole in the output pipe.

4. The tank of claim 1, wherein the solar return pipe is parallel to the longitudinal axis of the tank.

5. The tank of claim 1, further comprising a pump, the pump exerting pressure upon the fluid in the solar return pipe, allowing the fluid to pass from the solar return pipe and into the output pipe, so that the fluid exits the tank.

6. The tank of claim 5, wherein the fluid in the output pipe is passed through a heat exchanger after leaving the tank.

7. The tank of claim 6, wherein the fluid passed into the heat exchanger is the hottest fluid in the tank.

8. The tank of claim 7, wherein the fluid leaving the heat exchanger returns to a solar heating circuit after undergoing heat transfer.

9. The tank of claim 1, wherein the solar return pipe is connected to a solar heating circuit, so that the fluid returns from the solar heating circuit and into the solar return pipe.

10. The tank of claim 1, wherein the tank has a shape selected from a group consisting of a cylinder, rectangular cube, polyhedron, hexahedron, cuboid, trapezoid, pentagon, or cone.

11. The tank of claim 1, wherein the solar return pipe enters the tank above the level of fluid located within the tank and wherein the length of the solar return pipe extends the full height of the tank.

12. The tank of claim 1, wherein the tank is insulated and has poor heat transfer properties.

13. The tank of claim 1, wherein the solar return pipe is insulated and has poor heat transfer properties.

14. The tank of claim 9, wherein the solar return pipe comprises:
an internal return pipe, the internal pipe being internal to and parallel to the longitudinal axis of the tank; and
an external return pipe, the external return pipe being connected to the solar heating circuit, the external return pipe being connected with the internal return pipe and allowing the fluid returning from the solar heating circuit to pass through the external return pipe into the internal return pipe.

15. A drainback tank comprising:
a housing, the housing having a base and at least one side wall, the at least one side wall and the base forming an internal body for storing a fluid; and
a solar return pipe, at least a portion of the solar return pipe being located within the internal body of the tank, the solar return pipe having a hole;
wherein the housing has a hole in the side of the housing that allows the fluid to exit the internal body of the tank, the hole of the housing being aligned with and within a few inches of the hole of the solar return pipe,
wherein a center axis of the hole of the solar return pipe is aligned with a center axis of the hole of the output pipe along a plane,
wherein the fluid in the solar return input pipe flows into the hole of the housing and leaves the tank housing through the hole in the housing, and
wherein the hole in the solar return pipe is located below the fluid level in the tank and towards the bottom of the solar return pipe.

16. The tank of claim 15, further comprising an output pipe, the output pipe being attached to the hole in the side of the housing, such that the fluid in the tank exits the hole in the housing and enters the output pipe to leave the tank housing.

17. The tank of claim 15, further comprising a suction port, the suction port being connected to the hole in the housing and having an angled flange that fills the hole in the housing and interacts with the output pipe.

18. The tank of claim 15, wherein the hole in the solar return pipe is located less than five inches from the hole in the housing.

19. The tank of claim 15, wherein the hole in the solar return pipe is located less than one inch from the hole in the housing.

20. The tank of claim 16, further comprising a pump, the pump exerting pressure upon the fluid in the solar return pipe, allowing the fluid to pass from the solar return pipe and into the output pipe, so that the fluid exits the tank.

21. The tank of claim 16, wherein the fluid in the output pipe is passed through a heat exchanger after leaving the tank.

22. The tank of claim 21, wherein the fluid leaving the heat exchanger returns to a solar heating circuit after undergoing heat transfer.

23. The tank of claim 15, wherein the solar return pipe is connected to a solar heating circuit, so that the fluid returns from the solar heating circuit and into the solar return pipe.

24. The tank of claim 15, wherein the solar return pipe comprises:
an internal return pipe, the internal pipe being internal to and parallel to the longitudinal axis of the tank; and
an external return pipe, the external return pipe being connected to the solar heating circuit, the external return pipe being connected with the internal return pipe and allowing the fluid returning from the solar heating circuit to pass through the external return pipe into the internal return pipe.

25. A solar heating system comprising:
a heat exchanger;
a hot water storage tank, the hot water storage tank comprising:
a housing, the housing having a base and at least one side wall, the at least one side wall and the base forming an internal body for storing a fluid, and a pipe, the pipe passing the fluid from the housing to the heat exchanger; and
a drainback tank, the drainback tank comprising:
a housing, the housing having a base and at least one side wall, the at least one side wall and the base forming an internal body for storing a fluid;
a solar return pipe, at least a portion of the solar return pipe being located within the internal body of the drainback tank, the solar return pipe having a hole; and
an output pipe, the output pipe being attached to and passing through the housing and into the internal body of the drainback tank, the output pipe having a hole located within the internal body of the drainback tank, the hole of the output pipe being aligned with and within a few inches of the hole of the solar return pipe,
wherein a center axis of the hole of the solar return pipe is aligned with a center axis of the hole of the output pipe along a plane,
wherein the fluid in the solar return input pipe flows into the output pipe and leaves the tank housing and flows into the heat exchanger, and
wherein the hole in the solar return pipe is located below the fluid level in the tank and towards the bottom of the solar return pipe.

26. The solar heating system of claim 25, wherein the fluid of the drainback enters the heat exchanger and transfers heat to the fluid from the hot water storage tank.

* * * * *